Dec. 3, 1929.   W. J. PERKINS   1,738,261
AEROPLANE HANDLING STRUCTURE
Filed July 24, 1922   6 Sheets-Sheet 2
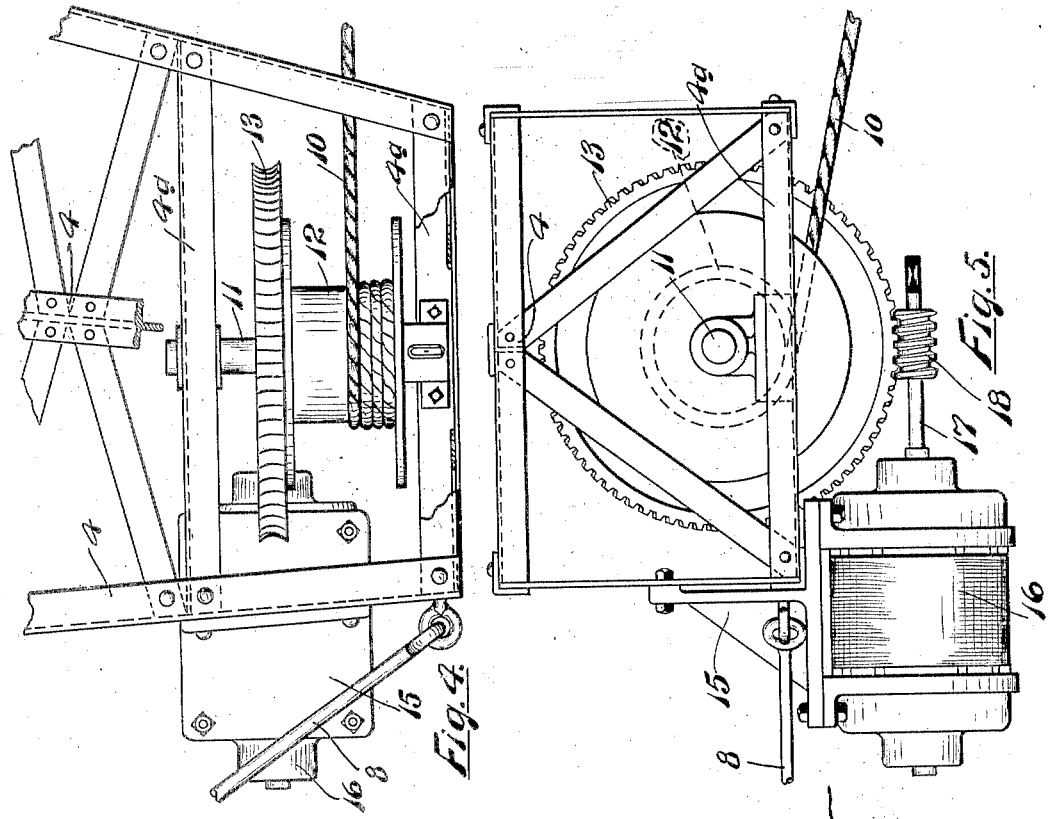
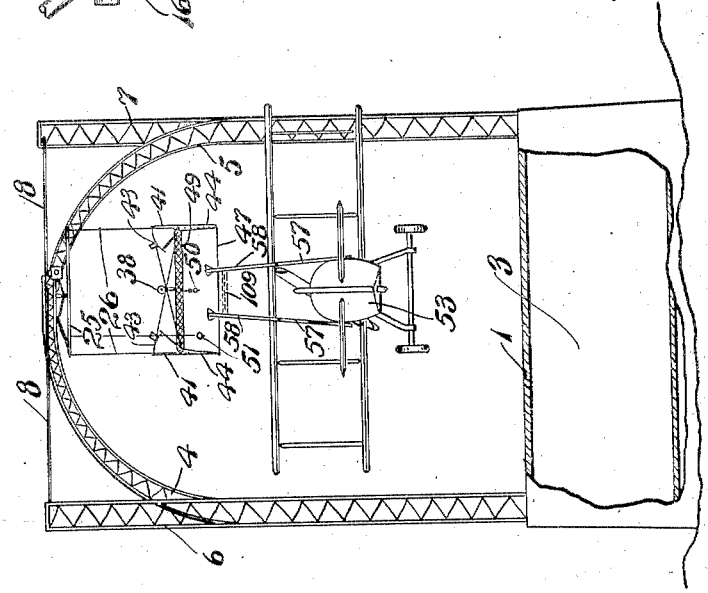
Inventor
Willis J. Perkins
By Frank E. Liverance, Jr.
Attorney

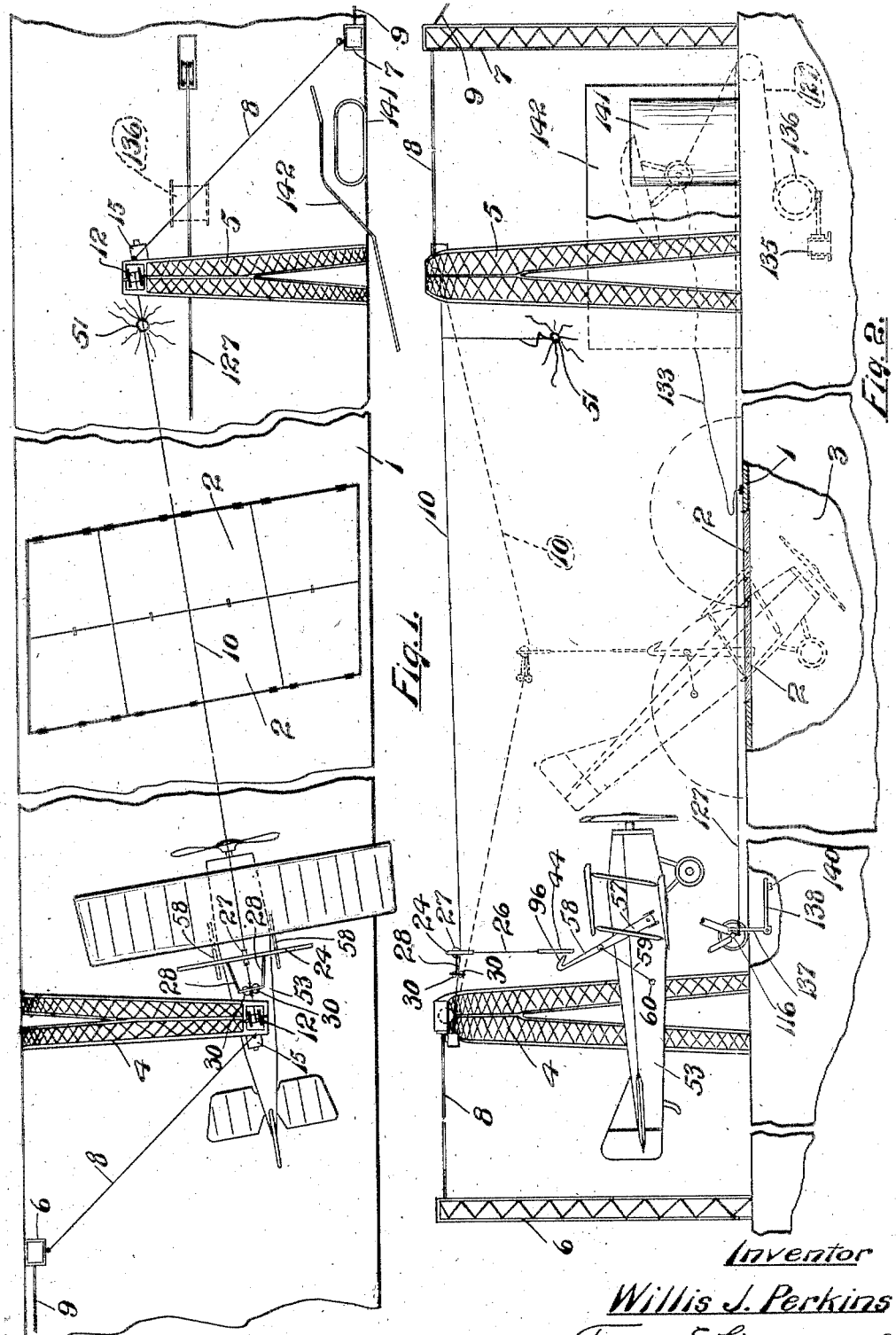

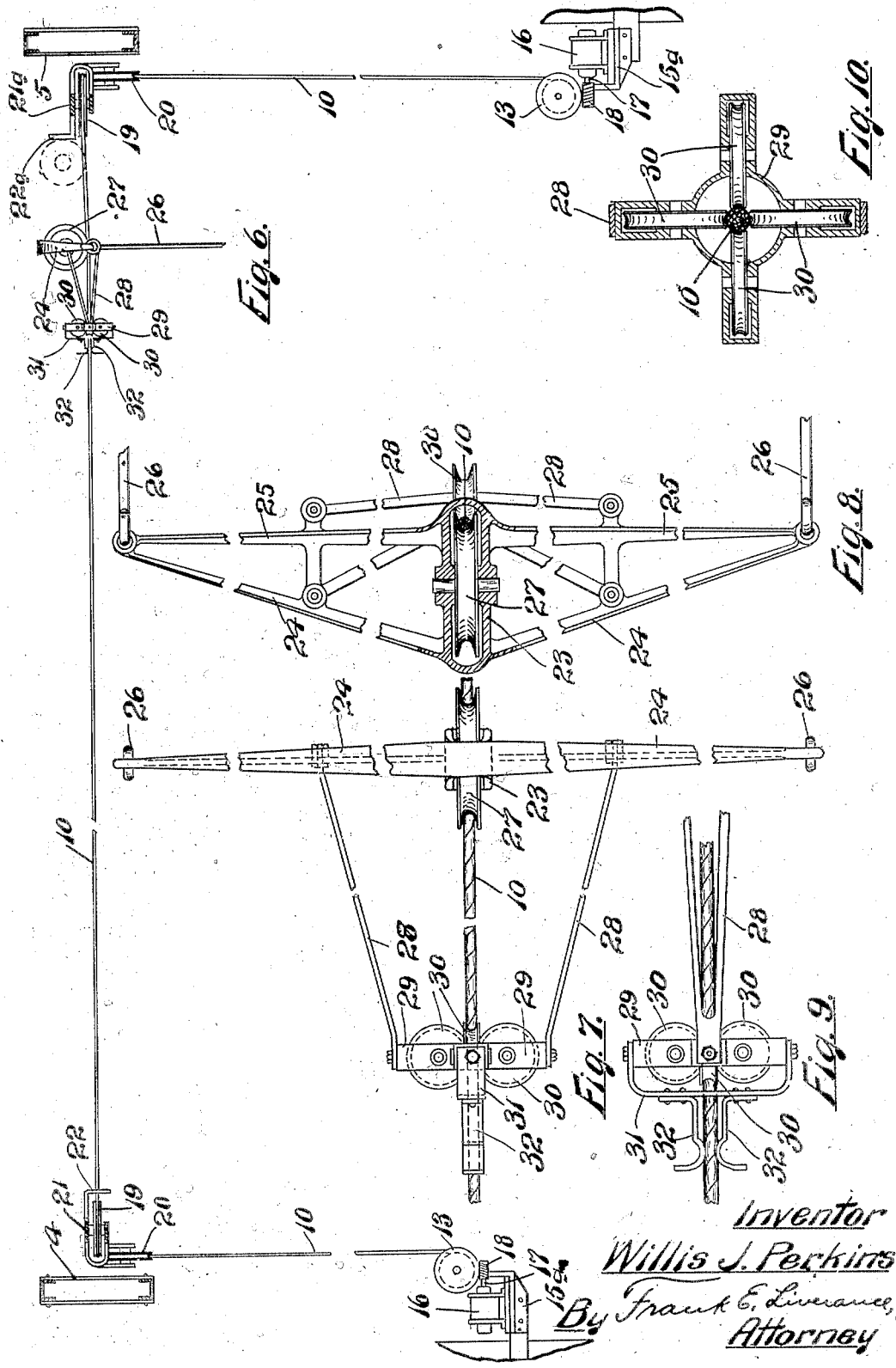

Dec. 3, 1929.                    W. J. PERKINS                    1,738,261
                            AEROPLANE HANDLING STRUCTURE
                    Filed July 24, 1922      6 Sheets-Sheet 4
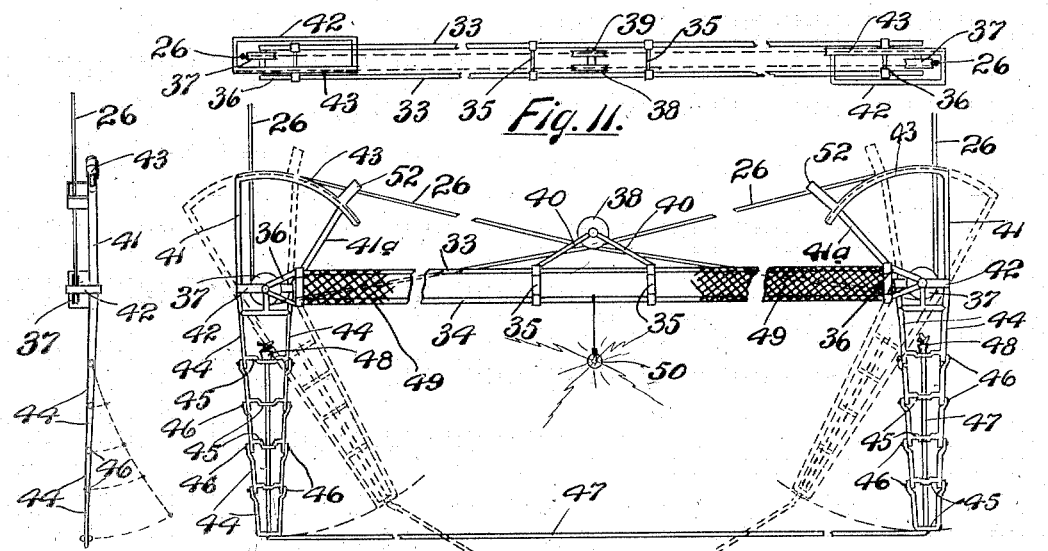
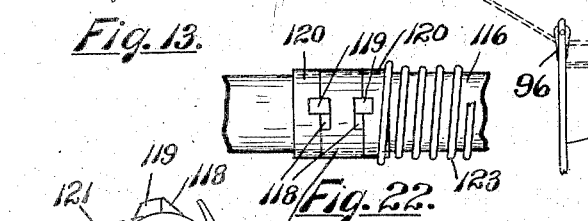
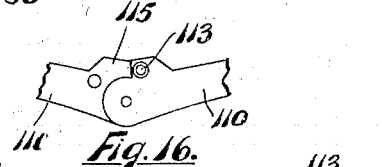
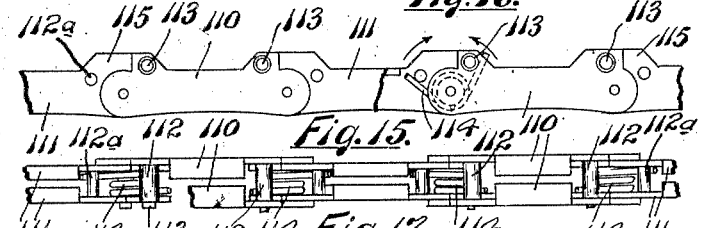
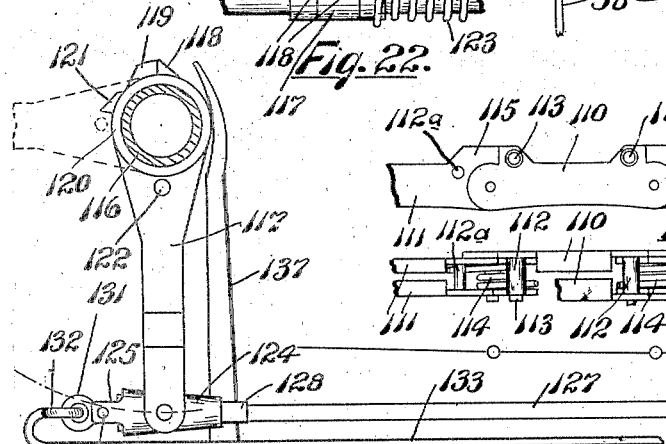
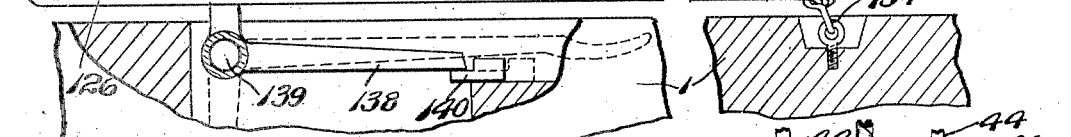
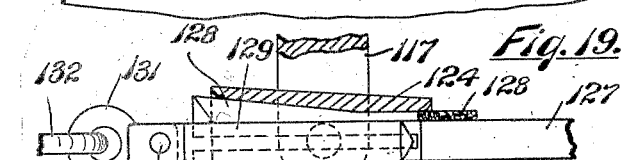
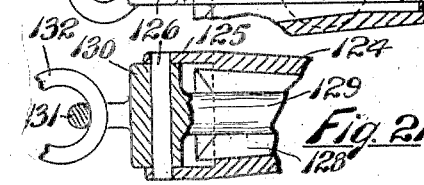
Inventor
Willis J. Perkins
By Frank E. Liverance, Jr.
Attorney Dec. 3, 1929.  W. J. PERKINS  1,738,261
AEROPLANE HANDLING STRUCTURE
Filed July 24, 1922  6 Sheets-Sheet 5
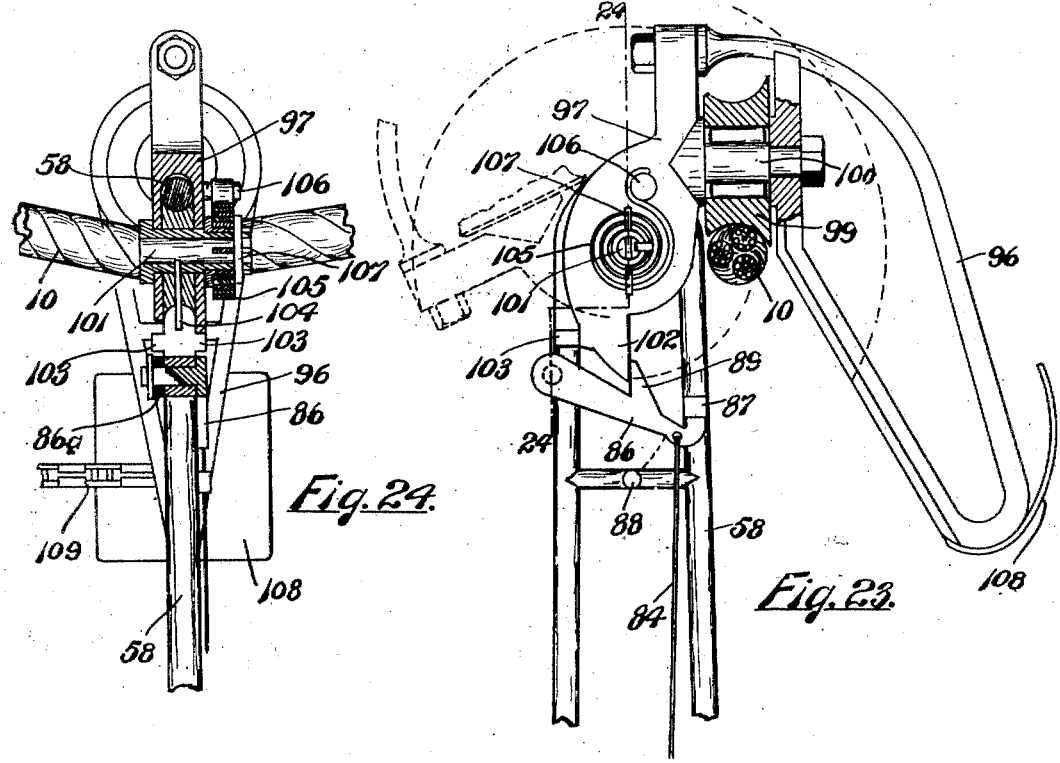
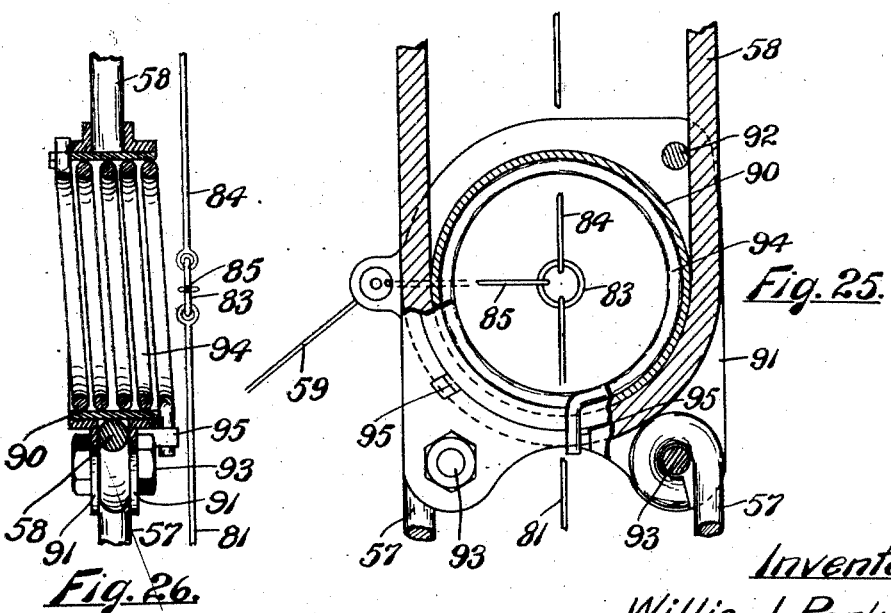
Inventor
Willis J. Perkins
By Frank E. Liverance, Jr.
Attorney Dec. 3, 1929.  W. J. PERKINS  1,738,261
AEROPLANE HANDLING STRUCTURE
Filed July 24, 1922   6 Sheets-Sheet 6
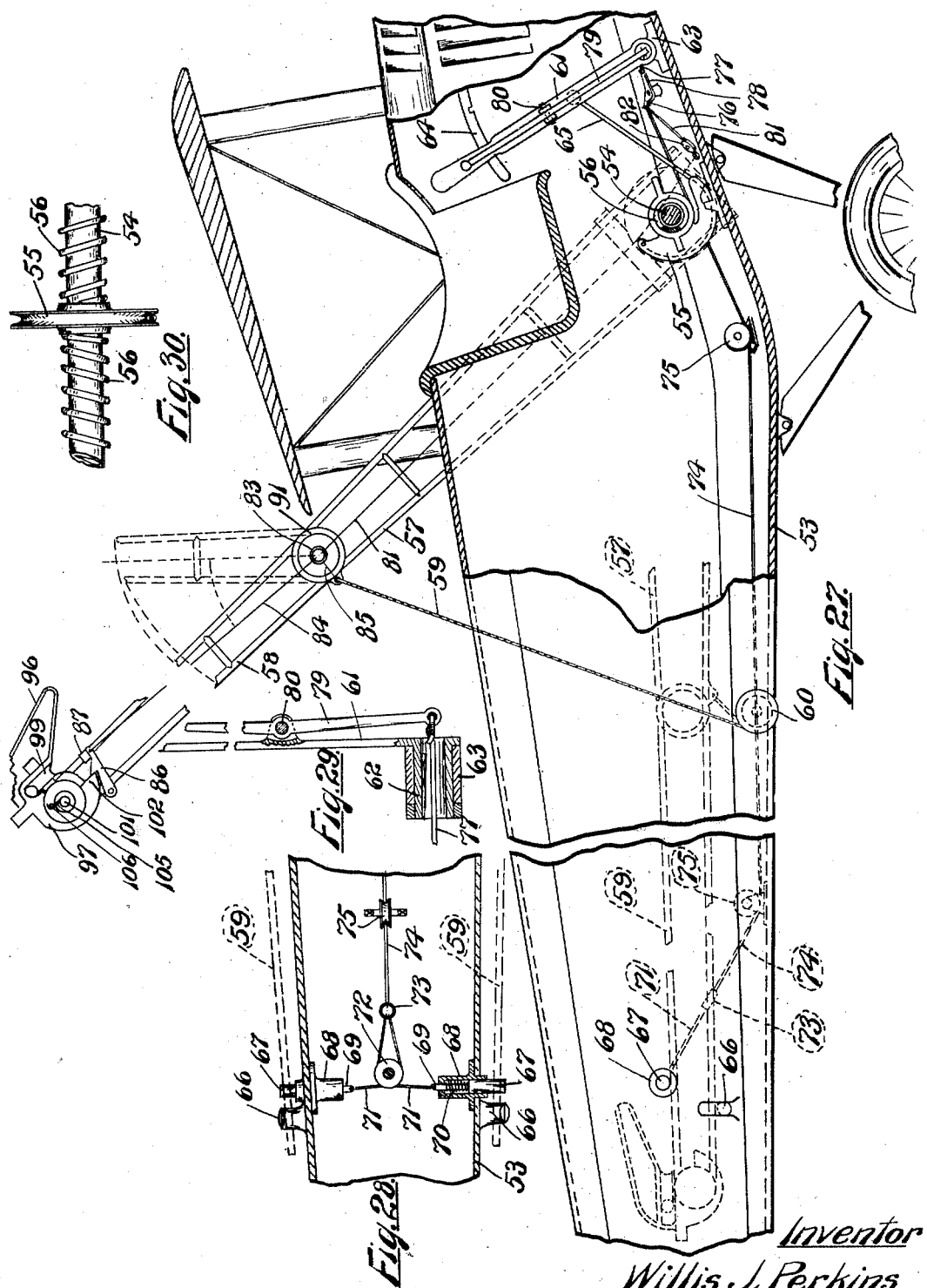
Inventor
*Willis J. Perkins*
By *Frank E. Liverance Jr.*
Attorney Patented Dec. 3, 1929

1,738,261

UNITED STATES PATENT OFFICE

WILLIS J. PERKINS, OF GRAND RAPIDS, MICHIGAN, ASSIGNOR TO WILLIS B. PERKINS AND BURGESS M. KIDDER, BOTH OF GRAND RAPIDS, MICHIGAN

AEROPLANE-HANDLING STRUCTURE

Application filed July 24, 1922. Serial No. 576,959.

This invention relates to novel constructions designed for the landing, launching and storing of aeroplanes of the different types thereof for use on either land or water, being more particularly concerned with the landing and stopping, and the storage and launching of the same on water going vessels.

The present constructions carry forward and make more practical the handling of aeroplanes, including portions of previous constructions invented by me as disclosed in my prior applications for patent, as follows: Serial Numbers 180,787; 192,101; 322,897; 327,238; and 486,971, filed, respectively, July 16, 1917; Sept. 19, 1917; Sept. 10, 1919; Sept. 29, 1919; and June 23, 1921.

It is an object and purpose of the present invention to greatly improve the constructions therein shown and make them more serviceable for aeroplane handling purposes, particularly in connection with water vessels, eliminating the effect of roll of the ship, dimensions thereof as the length, and variable deck conditions of an unfavorable nature such as rain, spray, sleet, ice, snow and other handicaps; particularly such handicaps as the rise and fall, the roll and lengthwise pitching of the vessel as occurs in certain kinds of weather.

A further object of the invention is to provide a means for landing which is a guide for the pilot, giving visible guidance to the pilot so that greater safety in landing is had as compared to the necessary leveling of the plane and impossibility of seeing the landing place at instant of landing as now practiced.

A still further object is to provide novel means for automatically centering the landed plane lengthwise of the landing element after landing.

A still further object is to provide novel means for handling the aeroplane after it has been stopped, a novel means of lowering it to the ground or the deck of a ship being used, together with provisions for lowering the aeroplane into the hold of the ship when not in use, the elevation to the deck being as easily accomplished with the same means.

Many other objects and purposes, including various improvements in the landing trapeze; the means for giving the landing trapeze a certain length of travel after the aeroplane has connected therewith in landing coupled with means for checking the momentum and speed of the plane, a means for controlling the trolley run or track on which the trapeze has such movement; improvements in the landing hook structure for the aeroplane involving self centering means and manual control means, all tending to lightness and strength for the weight used; and a novel and improved means for manually controlling the position of the landing hook structure, releasing it for service and drawing it into intimate engagement with the sides of the fuselage when not in use. In addition improvements in the launching mechanism for giving an impulse to flight movement in addition to that made by the propeller of the areoplane are contemplated, together with a safeguard against any disturbances of the air likely to be caused by heat from the ship funnels, the products of combustion coming therefrom, and the like.

These objects and purposes, above stated, together with many others not at this time specifically outlined, and novel constructions for attaining the same will be apparent as understanding of the invention is had from the following description, taken in connection with the accompanying drawings, in which, Fig. 1 is a plan of a portion of the deck of a ship, my invention being applied thereto, an aeroplane being shown in the act of landing.

Fig. 2 is a side elevation of the structure shown in Fig. 1, together with a dotted line indication illustrating the lowering of a landed plane into the hold of the ship.

Fig. 3 is an end elevation.

Fig. 4 is a plan of one of the trolley cable winding units located at the inner end of each of the supports therefor.

Fig. 5 is an end elevation of the construction shown in Fig. 4.

Fig. 6 is a diagrammatic elevation of a modification in construction for supporting and controlling said trolley cable.

Fig. 7, is a plan of the trolley carriage used for carrying the landing trapeze.

Fig. 8 is a front elevation thereof, parts being broken away and in section for better disclosure.

Fig. 9 is a fragmentary side elevation of the guiding wheels and retarding shoes for the trolley carriage.

Fig. 10 is an enlarged transverse section through the mount for said guiding wheels.

Fig. 11 is a plan of the improved trapeze used in landing.

Fig. 12 is a front elevation thereof.

Fig. 13 is an end view of the trapeze.

Fig. 14 is a fragmentary enlarged front elevation, partly in section illustrating the pivotal connection of the several sections making up the lower portions of the trapeze sides.

Fig. 15 is a fragmentary front view of the landing hook spacing chain, used also for properly positioning the landing hook structure alongside the fuselage when not in use.

Fig. 16 is a fragmentary front elevation showing one position of two links of the chain in one of its operative positions.

Fig. 17 is a plan of said chain.

Fig. 18 is a diagrammatic outline of the extended position of said chain.

Fig. 19 is a fragmentary elevation, with parts in section and broken away illustrating the details of attaching structure of the launching accelerating means used in starting flight.

Fig. 20 is a fragmentary elevation, partly in section, of the automatically operable detachable connection used between the aeroplane and the accelerating line.

Fig. 21 is a fragmentary horizontal section therethrough.

Fig. 22 is a fragmentary plan of the aeroplane axle and spring controlled arm mounted thereon to which the accelerating line is attached in practice.

Fig. 23 is a side elevation, with parts in section, of the improved landing hook, two of which are used.

Fig. 24 is a section and elevation, on the plane of the broken line 24—24, of Fig. 23.

Fig. 25 is a side elevation, partly in section of the intermediate joint used in connecting the two parts of the hook supports.

Fig. 26 is a central longitudinal section through said joint construction.

Fig. 27 is a partial side elevation and section of an aeroplane fuselage equipped with the novel controls which I have devised for operating and controlling the landing hooks.

Fig. 28 is a fragmentary horizontal section taken longitudinally of the fuselage, illustrating the retaining means used for holding the landing hooks and supports therefor alongside the fuselage.

Fig. 29 is a fragmentary elevation, partly in section showing the manually operable control levers used, and Fig. 30 is a fragmentary elevation of the spring actuated shaft on which the landing hook supports are connected at their lever ends.

Like reference characters refer to like parts in the several figures of the drawings.

In the constructions illustrated, the main deck 1 of a ship is provided with hatches 2, normally closing the hatchway opening into the hold of the ship, indicated at 3, in which the planes are stored when not in use. At opposite sides of the deck and spaced a distance apart in the length of the ship are vertical supports, 4 and 5, the upper end portions of which are turned inwardly over the deck, and preferably extended beyond the center of the same thereby making semi-arches between the ends of which a trolley cable may be carried diagonally across and above the deck. Columns 6 and 7, preferably in vertical alinement with the supports 4 and 5 on the same sides of the deck and spaced a distance therefrom are used to which to secure reinforcing and bracing cables 8 attached to the inner ends of the said supports and the upper ends of the columns. In addition, the columns are strengthened by guy wires or cables 9 reaching from the upper ends thereof to the deck, or other suitable anchorage. This makes a strong yet light construction to take the strains of landing the aeroplane on the cable between the semi-arch supports, as will hereafter appear.

The cable 10 is disposed horizontally between the inner ends of the supports. A short horizontal shaft 11 is mounted on suitable bearings in cross members 4ª at the inner end of each support, on which shafts drums 12 are secured, the end portions of the cable winding around the drums. A worm wheel 13 is fixed to each shaft 11. A bracket 15 attached at one side of the end portion of each semi-arch support is used for the carrying of an electric motor 16 below it, on the shaft 17 of which a worm 18 is secured for engagement with and driving of the worm or tangent wheels 13. Said motors are reversible in operation so that the cable wound on the drums may be brought to the horizontal or slackened so as to sag downwardly between the supports, or it can be maintained horizontal and moved lengthwise back and forth between the supports, as is obvious.

Instead of having the motors 16 mounted at the ends of the supports 4 and 5, suitable idle pulleys 19 and 20 may be mounted at or adjacent the ends of said supports and the cable passed around the same to change its direction, thereafter leading to the drums 13, as shown in Fig. 6. The brackets 15ª carrying the motors 16 may be located at any convenient place for control of the motors by attendants. The pulley 19 may be carried in a hanger 21 having an end portion as passing across the cable 10, the cable passing therethrough, and in like manner at the other support 5, the pulley 19 may be carried in a hanger 21ª, an end portion 22ª thereof extending in the front opposite direction, as shown, thereby forming a stop for the front end of the trolley carriage, later described.

A trolley carriage is mounted on the cable 10 to traverse the same. In construction this carriage may comprise a centrally located housing 23, from the upper portions of which arms 24 extend in opposite directions, other arms 25 extending in opposite directions from the lower portions of the housing and joining at their outer ends with the outer ends of said arms 24. Suitable bracing members connect the arms 24 and 25 to make a strong truss structure with minimum weight. Trapeze carrying lines 26 are connected to and depend from the ends of the carriage as shown. A trolley wheel 27 is designed to be rotatably mounted in the housing 23 to run on the cable 10. Side members 28 may be connected to the trolley carriage at each side of the cable, extending rearwardly and having connection at opposite sides of a housing 29 in which four rollers 30 positioned at right angles to each other may be rotatably mounted to bear against the cable 10 at four sides thereof. Of course the number of rollers may be varied without changing the principle of operation. A vertically positioned bracket 31 is attached to the housing 29 at its upper and lower sides, passing across the cable 10 which runs through a suitable opening in the bracket, and upper and lower spring tensioned brake shoes 32 are attached to the bracket and extend rearwardly therefrom to bear one against the upper and the other against the lower side of the cable. This trolley carriage with its depending lines 26 and attached trapeze landing element, to be later described, mounted as described on the trolley cable has a range or swinging movement such that, irrespective of the pitching and rolling of the ship, the aeroplane will remain horizontal, its weight, when connected with the trapeze keeping it at lowermost position at all times.

The trapeze landing element is somewhat similar to those shown in my previous applications, above noted, but with many improvements in construction for reduction of weight and number of parts, and an increase in flexibility coupled with simpler methods of automatically centering a landed aeroplane lengthwise thereof.

In its construction, a relatively rigid upper element is provided comprising parallel upper rods 33 and lower rods 34, preferably steel tubes, which are held and connected together by suitable intermediate brackets 35 and end brackets 36. The end brackets 36 each carry a pulley 37 around and under which the suspending lines 26 pass. Above and at the middle of said upper element two pulleys 38 and 39 are located being suitably connected to the said element by stays 40.

A frame 41 is pivotally connected at each end of the rigid element, extending a distance above and below the end of said rigid element and including suitable frame members 41ª, 42 and 43, the latter of which is curved in the arc of a circle and grooved at its upper side to receive a line 26. The lines 26 pass under the pulleys 37, thence across and under the pulleys 38 and 39, one line under each pulley, and then to and partly over the grooved curved members 43, as shown in Fig. 12.

The parts of the frames below the ends of the rigid element include spaced sides 44 connected adjacent their lower ends by a cross bar 45. A series of sections of similar construction, having sides 44 and a lower connecting cross bar 45 are pivotally connected together, and the upper section at each side is pivotally connected to the lower end of each frame, pivots 46 being used, as best shown in Fig. 14. A landing cable 47 is disposed horizontally between the lower ends of the lowermost sections and at its end portions is turned upwardly to pass through openings in the different cross bars 45, until the uppermost cross bar has been passed through, being then secured to a suitable stop 48 located above the uppermost cross bar, as shown in Fig. 12, whereby the landing cable is secured permanently to the trapeze. This makes a particularly light and flexible trapeze landing element, as is obvious. It is preferred to place a screen between the bars 33 and 34 at the landing side of the trapeze, as indicated at 49 to interpose a stop against accidental entrance of the landing hooks of the aeroplane between said bars. In addition, a light 50 is to be suspended from the middle of the upper rigid element of the trapeze, and a similar light 51 of a preferred color is suspended from the cable 10 adjacent the back support for the cable or adjacent the cable 10, as may be desired, the lights aligning and giving the pilot of the plane very important aid in properly guiding his plane in landing. If desired, suitable guard stirrups 52 may be attached to the parts 43, through which the end portions of the lines 26 pass for maintaining the lines on said parts.

The aeroplane fuselage 53 may be of any preferred type. A shaft 54 is mounted transversely through the fuselage in advance of the center of gravity of the fuselage, on which a curved sector 55 is secured substantially midway between the ends of the shaft. Coiled springs 56, attached at one end to said sector and at their other ends to a suitable relatively stationary part of the fuselage, under tension, act to give the shaft a tendency to rotate in one direction so as to elevate the landing hooks associated with the shaft when free to do so. At each end of the shaft a skeleton arm 57 is secured, the same extending rearwardly, each of said skeleton arms having a second arm 58 pivotally connected thereto for extension in alinement therewith or to be positioned at an angle thereto as circumstances may require. A cable 59, normally spring wound on a drum 60 attached to the fuselage back of the center of gravity thereof is attached to the upper end of each of the arms 57 to limit the extent that arms may move toward the upper plane of the aeroplane, and to provide a means for supporting the plane in level horizontal position when checked and stopped.

A lever 61 formed at its lower end with a hollow laterally extending pivot bushing 62 is mounted in the fuselage in front of the pilot's seat, the bushing being received in a bearing 63 connected to the fuselage. This lever may be moved back and forth between two positions controlled in the usual manner by a notched arc member 64. A cable or like flexible connection 65 connects the lever with the sector 55. By operation of the handle, the landing hook carrying arms 57 and 58 may be drawn to the dotted line position shown in Fig. 27 in alinement with the sides of the fuselage, against the force of spring 56. When thus drawn down to stream line position, the arms 58 are brought against stops 66 on which the same bear, being held thereagainst by latch bolts 67, one of which is slidably mounted in a housing 68 at each side of the fuselage above the stops 66. The bolts 67 have reduced stems 69 extending inwardly through the inner ends of the housing, springs 70 within the housings serving to normally impel the bolts outward. A line 71 is attached to each stem 69, the two lines extending toward each other and around idle guide rollers 72 and thence forward to a ring 73 to which both are connected. A single line 74 attached to the ring passes forward lengthwise of the fuselage under guide rollers 75 to adjacent the lever 61 having connection to one arm 76 of a bell-crank lever pivotally mounted to one side of the lower end of the lever 61. A short line 77 is connected to the other arm 78 of the bell-crank lever, extending therefrom through the bushing 62 and connected to the lower end of a lever 79 pivotally mounted between its ends at 80 to one side of the lever 61. Lever 79 may be moved at its upper end toward lever 61 thereupon retracting the locking bolts 67 and freeing the hook supports for movement to upper operative position; and when the said supports are drawn down to stream-line position, both levers may be simultaneously operated to draw the supports down and withdraw the bolts 67 so that the upper arms 58 of the supports may pass by the bolts to the stops 66.

Another line 81 is attached to the arm 76 of the bell-crank lever and has its direction changed around a pulley 82 to pass through an opening in the floor of the fuselage, thence extending lengthwise of the lower arm 57 to the pivot joint at its upper end. In fact, there are two of the lines 81, one for each of the hook support structures. With each, at the pivot joint a connection is made to a ring 83, and another line 84 in alinement with the line 81 extends substantially lengthwise of the upper arm of each hook support member. In order to keep the ring in approximately the same position, it is connected to the arm 57 with which it is associated by a short connection 85. The lines 84 extend to and are connected each to a latch lever 86 pivotally mounted on each of the arms 58 near the upper end thereof, spring actuated by a spring $86^a$ to normally bear against a stop 87 on the arm 58, its movement in the opposite direction being limited by a second stop 88, as shown in Fig. 23. The latch levers each have a latching hook or projection 89 for engagement with the landing hook mounted at the end of arm 58, as will be later described. Pulling on the lines 84 moves the latch levers to free the same from engagement with the landing hooks, and it is obvious that this operation is also controlled by the lever 79 without interference with the functions of said lever for operating the bolts 67.

The pivot or elbow joint between the two members 57 and 58 of the landing hook supports is of novel construction and an improvement over the joints in such like members shown in my prior applications. The upper arm 58 is made chiefly from a rod which is bent in the arc of a circle around a sleeve or cylinder 90 at its end where it is joined with the lower arm 57. Two plates 91 are located around the sleeve and have flanged portions embracing the sides of the rod from which member 58 is made, also lying to each side of the eyes formed at the upper ends of the rods from which the lower member 57 is made. The plates are joined together and clamped against the members forming the arms 57 and 57 by bolts 92 and 93, as shown in Fig. 25, the bolt 92 in addition serving as a stop to locate the members 57 and 58 in alinement when moved to such position, permitting no movement beyond such alined position in one direction. A coiled spring 94 is housed within the sleeve 90, having connection thereto at one end and at the other engaging with one of the stops 95 on one of the plates 91, a plurality of which are provided in spaced apart relation. The spring may be varied in its tension by adjustment thereof to engage with different stops. The normal tendency of the spring is to locate the members 57 and 58 in alinement.

At the outer end of each of the members 58 a landing hook is mounted. Each hook comprises a hook part 96 which is connected to a block 97 of irregular shape, a roller 99 mounted on a stud 100 being disposed between the hook part and the block as shown in Fig. 23. The block is pivotally mounted on a pin 101 and has an inwardly extending stop 102 over which the hook of latch 86 is designed to engage, in such position bearing against a stop lug 103. The pin or sleeve 101 is held from rotation by a pin 104 and a band spring 105 is connected at one end to said sleeve 101 and at the other end with a pin 106 projecting from the block 97, the spring having a normal tendency to bring the part 102 against the stop lug 103. A cotter pin 107 is used to pass through the end of the sleeve 101 to hold the spring 105 in place.

Flight conditions and uncertainty of the pilot's skill, may and usually do bar the hooking on of the landing hooks 96—96, at the exact center of the trapeze landing rope 47. To automatically center the landed plane if landed thereon at one side of said center the anti-friction rollers 99—99 are placed in the supported angle of the landing hooks 96—96 thereby providing longitudinal free movement on landing rope 47, and bringing the plane to rest in a level transverse position and supported evenly on the twin landing hooks through being centrally longitudinally supported on said hooks.

The hooks 96 are designed to engage with the landing cable 47 of the trapeze and when thus engaged with the weight of the aeroplane carried by the hooks and their supports, there is a tendency of said supports to come together. I have provided a very effective and light spacing chain which permits the said supports to come to a certain predetermined spaced relation with respect to each other, but no closer, and which also draws the said supports into desired stream-line position at the sides of the fuselage when in lower inoperative position. The chain is indicated as a whole at 109 and is disposed between the upper arms 58 of the landing hook supports near their upper ends as shown in Figs. 12 and 24.

The chain, preferably comprises pairs of sheet metal links 110, pivotally connected alternately to pairs of links 111, also of sheet metal and laterally flanged for strength. Adjacent each end of the links 110 and above the pivots connecting the same with links 111 are stop pins 112. A coiled spring 114 is placed around each of the pivot pins, one end engaging with the pin 112 nearest and the other with a cross pin 112$^a$ disposed between the links 111, the tendency of the springs being to bow the chain into an upwardly curved form, or until the pin 112 engages with a projecting stop lug 115 on the adjacent link 111. When stopped in this position, the chain cannot be further bent or curved and the support arms 58 cannot be brought closer together through the weight of the plane resting thereon in the bend or angle of the yielding landing member 47. When the supports for the landing hooks are drawn down alongside the fuselage, the chain passes over the upper side of the fuselage, being curved in the opposite direction, there being no stop interposed against the bending of the chain in this direction, only the springs 114 to overcome.

For the launching of the plane from the deck of the ship, or a suitable platform on land or water, I have provided a novel and improved construction of flight impulse mechanism to cooperate with the impulse given by the propeller of the plane at the beginning of flight. On the axle 116 of the under carrying structure of the plane, an arm 117 may be loosely mounted, the part of the arm passing around the axle having stop lugs 118 projecting to engage with stop lugs 119 extending from two collars 120 fixed on the axle one at each side of the arm which stops the arm from further rotation when it is turned to its downwardly extending vertical position, as shown in Fig. 19. Normally the arm is turned into an upper position as shown in dotted lines in Fig. 19, by a spring 123 around the axle and connected with the arm and axle, a stop 121 on the collars 120 being engaged by stop pin 122 on the arm to hold the arm from further movement. In such position, the arm is out of the way and along the under side of the fuselage as when in flight.

A sleeve 124 with a tapered bore interiorly is pivotally connected to the forked lower end of the arm 117, at its rear end having two oppositely disposed ears 125 projecting through which a pin of relatively friable material, such as lead, or wood or the like is to be passed, as indicated at 126. A cable 127 has a leather or like flexible member 128 fixed at one end, said member being shaped exteriorly to fit the tapered interior bore of the sleeve 124 and interiorly having a straight hole and being longitudinally multiple slotted for the greater portion of its length and all of its larger tapered length, so that it may be inserted into the sleeve at its smaller end by compressing it together. A rod or releasing pin 129, entered into and filling the interior of member 128 serves to hold the member against inward compression, said releasing pin having a head 130 adapted to locate between the ears 125 and through which the shearing pin 126 passes. The head 130 may be equipped with a ring or eye 131 with which a second ring 132 on the end of a releasing line 133 is connected, the opposite end of the releasing line being permanently secured at 134 to the deck of the ship or equivalent platform installation in advance of the point of starting the plane in flight.

An electric motor 135 may be located under the deck or platform to drive a drum 136 around which the cable 127 may be led and a suitable magnetic clutch may be interposed between the motor and drum so that the motor may be started and the clutch slip until such time as said drum is required to wind the line or cable 127. It is evident that the cable 127 is drawn tight and a tendency is created and maintained to draw the arm and attached plane forward under such conditions.

In order to hold the plane against such movement until the desired time of release is reached, a trip mechanism is provided including arms 137 to engage against the axle at each side of the arm 117 and an arm 138 projecting at right angles, substantially, from the lower ends of arms 137, this structure being pivotally mounted at 139 at a convenient place relative to the deck or platform. The end of arm 139 may be engaged with a movably mounted catch member 140 adapted to be manually moved out of the way at a desired time to free said arms 138 and 137 and permit the same to take the dotted line positions shown in Fig. 19.

In practice at the starting or launching of a plane, it is placed on the deck with its axle 116 back of the upper ends of arms 137, and the latch member 140 engaged with arm 138. The propeller of the plane may be started and the same driven at its required speed for flight, but the plane is held from movement by said arms 137. The motor 135 may then be started after the engine of the plane is running properly at desired speed and the cable 127 tightened. When this has been done, catch 140 is moved to free the plane for movement. The propeller impulse, plus that given by the cable 127 draws the plane forward rapidly so that speed for flight and rising from the deck is practically attained in a relatively short travel of the plane. As the plane speeds forward over the deck and rises therefrom or remains thereon, the line 133 becomes taut and the pin 126 is sheared off, withdrawing the locking rod 129 out of the member 128 which then collapses and is drawn from the sleeve 124 as the plane continues its flight. The pin 126, being of soft metal or other equivalent material readily shears off to permit this automatic unlocking of the auxiliary starting cable 127 from the plane and the arm 117 turns back under the fuselage through the influence of the spring 123 so as to be out of the way. In order that the heated air from the ship's furnaces shall not interfere with the landing it is desirable that the funnels 141 be placed forward as far as practicable and a screen or baffle plate 142 used between the funnel and the course of the plane in landing, as shown in Figs. 1 and 2.

In practice, aeroplanes land flying towards the stern of the ship, the ship heading into the wind. In the take off the aeroplanes are started off from the bow of the ship and preferably in advance of the ship's funnels and all other conventional obstruction. The drawings, Figs. 1 and 2 show both the landing and starting space as being the same. Said drawing is diagrammatic and is so made for the purpose of avoiding drawing complications through additional sheets and figures. It is evident, that the take off could not be made both from the stern of the ship and off the bow of the ship, so it must be considered, that the starting off means are in advance of the landing means.

When the plane is in flight, the landing hook supports are normally alongside of the fuselage. When the plane is to land, the pilot approaches at the stern of the ship with landing hooks elevated into hooking-on adjustment, and guided mainly by the lights 50 and 51 alines his plane for connection of the landing hooks with the cable 47 of the landing trapeze. This trapeze is brought as far astern as possible, it being evident that the trolley cable 11 may be run back to any desired amount, carrying the trolley carriage with it or until the ends of the shoes 32 strike against the part 22 (Fig. 6); and if the winding of the cable is not stopped immediately, it can be drawn through between the shoes, no danger of breakage arising. When the plane approaches the trapeze for landing, the pilot by operating the levers 61 and 79 frees the landing hook supports for elevation to upper or landing position and the hooks connect with the cable 47 on reaching the same.

While operation of the lever 79 has withdrawn the latches 86 temporarily, this has no effect as the spring 105 holds the landing hooks in position until the latches have returned. The hooks at the instant of connecting with the cable 47, tend to swing the trapeze forwardly, to lessen the static inertia due to the weight of the trapeze part, the jointed sections at the sides of the lower portions of the trapeze permitting this, being substituted for formerly used stiff elements. The trapeze is also readily flexible in that the cable 47 is flexible and the side frames swing about the pivots at the ends of the upper rigid member, the same as described in my former application and for the same functions and purposes in cushioning the landing. The trapeze and the connected trolley carriage may be drawn forward with the plane according to landing conditions, the carriage running over the cable 10, being retarded by the brake shoes 32 and upward incline or pitch of the cable. And at the same time, the cable 10 may be run in a reverse direction, all tending to quickly bring the plane to a stop. The carriage has a straightaway run and has full freedom of movement so that any rolling of the ship has no effect on the plane to swing it, its weight keeping it plumb at all times.

When the plane has been brought to rest, the cable may be wound from one drum to the other to bring the carriage and plane suspended therefrom over the hatches 2 in the deck, the hatchway opened and the plane lowered by slacking the trolley cable by unwinding from one of the drums 13, and as indicated in Fig. 2, the plane being lowered into the hold for repair, storage, or the like. The hooks may be released from the trapeze landing cable 47 by unlatching the latches 86 whereupon the hooks may be turned backward. In fact, in landing, if the pilot is not satisfied with the landing about to be made, no landing need be made as the lever 79 may be operated to free the landing hooks so that they will turn to the rear when engaging with the trapeze, and the flight continued and a new attempt for landing made. The free open space under the semi-arch supports for the trolley cable permits the continued flight of the plane, if desired, this being an important safeguard, as is evident.

The construction for landing planes is comparatively simple, safe and practical. Snow, ice, rain, invisibility of landing objective and other natural handicaps have their effects obviated. Guarding is made against the engagement of the landing hooks between the tubes 33 and 34 of the upper rigid member by the screen 49 as well as by a guard fender 108 on the hooks. This contingency of such connection is so remote, however, as to be practically one to be disregarded. The weight of superstructure is little. The run for the trolley carriage is straight. Means for checking the speed and momentum of the air craft is provided. The double function of the trolley cable, as a support for the trolley carriage and an elevating means for raising or lowering the aeroplanes is novel and exceptionally practical from its simplicity, while the carriage mounting thereon obviates effects of the rolling or pitching of the ship in heavy seas. All of these features stated and many other which are apparent make the invention one of the practical value and importance.

The invention is defined in the appended claims. Many minor changes in mechanical structure are possible, and it is to be understood that such changes coming within the scope of the claims are comprehended by the invention which, while complete in every operative sense as disclosed, is to be considered as diagrammatic of the invention rather than as limiting it to specific constructions other than as defined by said claims.

I claim:

1. A construction of the class described, comprising a substantially horizontal straight track element, means for supporting the same at a height above the ground or other surface, a carriage mounted on said track element to traverse the same, and means for connecting an aeroplane in landing with the carriage including a landing element suspended from the carriage and having sides movable inwardly and outwardly and carrying means for supporting an aeroplane, substantially as described.

2. A construction of the class described comprising a substantially horizontal straight track element, means for supporting the same at a height above the ground or of the surface, a carriage mounted on said track element to traverse the same, means for connecting an aeroplane in landing with the carriage including a landing element suspended from the carriage, and retarding means attached to the carriage and engaging with the track element to retard movement of the carriage on said element.

3. A construction of the class described, comprising two spaced apart supports of semi-arch form, a cable located between the supports and secured at its end portions thereto, a carriage mounted on the cable to traverse the same, and an aeroplane landing element suspended from the carriage, substantially as described.

4. A construction of the class described, comprising two spaced supports of semi-arch form, a cable located between the upper ends of the supports, winding drums on which the end portions of the cable are wound, motors for turning the drums in either direction, interlocking drive mechanism between the motors and drums, a carriage mounted on the cable to traverse the same, and an aeroplane landing element suspended from the carriage.

5. A construction of the class described, comprising spaced apart supports, a single trolley cable carried by and between the supports, a carriage mounted on the cable to traverse the same, means for tightening or slacking the cable between the supports, a pair of spaced apart lines depending from the carriage, and an aeroplane landing element carried by said lines, said means being operable without varying the length of the said pair of lines.

6. A construction of the class described, comprising spaced apart vertical supports located a distance apart and having upper end portions curved inwardly toward each other, a cable carried between the upper ends of the supports, a carriage mounted to traverse the cable including a roller to ride on the cable and a frame having portions extending in opposite directions from the roller, lines depending from the outer ends of the frame, and an aeroplane landing element carried by the lines, substantially as described.

7. In a construction of the class described, a substantially horizontal cable, means for supporting the same a distance above the deck of a ship or other surface, means around which the end portions of the cable are wound, means for tightening or slacking the cable between the supporting means therefor, a carriage mounted on the cable to traverse the same, an aeroplane landing element carried by and below the carriage, and means carried by the carriage frictionally engaging the cable to retard movement of the carriage on the cable.

8. In a construction of the class described, a substantially horizontal cable, means for supporting the same, a carriage mounted on the cable to traverse the same, said carriage including a frame located transversely of the cable and a roller rotatably carried by the frame and bearing against the cable, a housing located around the cable back of the frame, a plurality of rollers mounted in the housing and bearing against the cable at different points, means connecting the housing to the frame, lines depending from the frame and an aeroplane landing element carried by said lines.

9. A construction containing the elements in combination defined in claim 8, combined with a member attached to the rear side of the housing and through which the cable passes, and a plurality of spring members connected with said member and bearing against the cable for purposes of retarding movement of the carriage over the cable, substantially as described.

10. In a construction of the class described, two spaced apart supports, a flexible track member carried by and between the supports, independently operable means located at both supports for tightening or slacking said track member between the supports, an aeroplane landing element, and means for mounting the same on and below the track member for movement in a direction paralleling the length of the track member.

11. In a construction of the class described, a single substantially horizontal track element, means for supporting the same a distance above the ground or other surface, an aeroplane landing element, means for mounting the same on and below the track element, for movement in a direction paralleling the length of the track element, and yieldable means automatically engaging the track element and serving to retard such movement.

12. In a construction of the class described, two spaced apart supports, a flexible track element carried by and between the supports, an aeroplane landing element, means for mounting the same to be carried by and below the cable substantially at right angles thereto, and independently operable means located at said supports for raising or lowering the said landing element, substantially as described.

13. In combination, a ship having a deck, a vertical support located at each side of the deck and in spaced apart relation in the length of the deck, said supports at their upper ends being arched inwardly over the deck, a cable carried by and between the ends of said supports, said cable having a diagonal relation with respect to the longitudinal center line of the deck, a carriage mounted on the cable to traverse the same, and an aeroplane landing element suspended from the carriage.

14. In combination, a ship having a deck, said deck having an opening therein, a vertical support located at each side of the deck, one at each side of said opening, said supports being arched inwardly partly over the deck, a cable carried between the upper ends of said supports, an aeroplane landing element, means mounted to traverse the cable from which said element is suspended, and means to tighten or slacken the cable between the supports to thereby lower an aeroplane connected with said element through the opening in the deck or elevate an aeroplane from below to above the deck.

15. In combination with a substantially horizontal track, a carriage mounted to traverse the track, an aeroplane landing element suspended from the carriage, said element including a rigid member, frames pivotally connected to the ends of the rigid member to turn toward or away from each other, each of said frames at its lower end having a plurality of jointed sections connected therewith, the pivotal axes of which are at right angles to the pivotal axes of the frames, and a landing cable connecting the lowermost of said sections.

16. An aeroplane landing element comprising a substantially horizontal rigid element, a frame pivotally mounted at each end of the rigid element and having parts extending below the pivots, a plurality of sections pivotally connected together and pivotally suspended from the lower ends of the frames, the axes of pivotal connection of the sections being in substantially the same vertical plane with said rigid element, and a flexible member disposed between the lowermost of said sections and permanently connected with the sections, substantially as described.

17. In a construction of the character described, a substantially horizontal track element, an aeroplane engaging landing element, means for suspending said aeroplane landing element below the track element and for mounting the same to traverse the length of the track element, a flight indicating element carried by the aeroplane landing element, and a second flight indicating element suspended from the track element near the end thereof toward which the said aeroplane landing element moves after connection of an aeroplane therewith.

18. In combination with an aeroplane landing member mounted for movement in a straight line after engagement of an aeroplane in flight therewith, of two lights, one connected with the landing member and the other positioned at a point in advance so that the two lights are in alinement with the direction of movement of said landing member, substantially as described.

19. In combination with the fuselage of an aeroplane, two supports located one at each side of the fuselage, hook members connected one to the outer end of each support, a shaft passing horizontally through the fuselage to which the supports are secured at their opposite ends, spring means tending to rotate the shaft to elevate the supports, and manually operable means for drawing the supports to a lower position alongside the sides of the fuselage.

20. In combination with the fuselage of an aeroplane, two supports located one at each side of the fuselage, hook members connected one to the outer end of each support, means for pivotally connecting the supports at their opposite ends to the fuselage, spring means normally tending to elevate the supports, manually operable means for drawing the supports to a lower position alongside the fuselage, latching means for holding the supports in such position, and manually operable means for operating the latching means to an inoperative position.

21. In combination with the fuselage of an aeroplane, two elongated supports located one at each side of the fuselage, a hook member connected to the outer end of each support, a shaft passing horizontally through the fuselage to the ends of which said supports are secured, spring means associated with the shaft tending to turn it to elevate the supports, a pivotally mounted manually operable lever, connections between the lever and shaft for turning the shaft against the spring means to lower the supports, and means for holding the supports in lower position.

22. In combination with the fuselage of an aeroplane, two elongated supports located one at each side of the fuselage, a hook member connected to the outer end of each support, a shaft passing horizontally through the fuselage, the supports being connected to the ends thereof, spring means associated with the shaft tending to elevate the supports, a pivotally mounted manually operable lever, a sector connected to the shaft, and a flexible connection between the sector and lever for turning the shaft against the spring to lower the said supports.

23. A construction containing the elements in combination defined in claim 21, combined with manually operable means mounted on the lever and connections between said manually operable means and said holding means for moving the latter to inoperative position, substantially as described.

24. In combination with the fuselage of an aeroplane, two elongated supports located one at each side of the fuselage, a hook member connected to the outer end of each support, a shaft passing horizontally through the fuselage, said supports being connected to the ends thereof, spring means associated with the shaft tending to elevate the supports, a pivotally mounted manually operable lever, connections between the lever and the shaft for turning the shaft against the spring means to lower the supports, spring actuated latch bolts mounted in opposite sides of the fuselage, a second lever mounted on the first lever, and means connecting said latch bolts and second lever whereby said bolts may be retracted by the lever.

25. In combination with the fuselage of an aeroplane, two elongated supports located one at each side of the fuselage, a hook member pivotally connected to the outer end of each support, latches for holding said hook members in operative position, a shaft passing horizontally through the fuselage, said supports being connected to the ends thereof, spring means associated with the shaft tending to elevate the supports, a pivotally mounted manually operable lever, connections between the lever and the shaft for turning the shaft against the spring means to lower the supports, spring actuated latch bolts movably mounted in opposite sides of the fuselage to engage with and hold the supports in lower position, a second lever pivotally mounted on the first lever, means operatively connecting the latch bolts with the second lever and means operatively connecting the latches for the hook members with the second lever whereby said latch bolts and said latches may be moved by operation of said second lever.

26. In combination with the fuselage of an aeroplane, two elongated supports located one at each side of the fuselage, a hook member pivotally connected to the outer end of each support, latches for holding said hook members in operative position, a shaft passing horizontally through the fuselage, said supports being connected to the ends thereof, spring means associated with the shaft tending to elevate the supports, a pivotally mounted manually operable lever, connections between the lever and the shaft for turning the shaft against the spring means to lower the supports, spring actuated latch bolts movably mounted in opposite sides of the fuselage to engage with and hold the supports in lower position, a second lever pivotally mounted on the first lever, a bell-crank lever pivotally mounted on the fuselage adjacent said other levers, a connection between the second lever and one arm of the bell-crank lever, lines connecting the other arm of the bell-crank lever with the hook latches, and a line connecting said other arm of the bell-crank lever with the latch bolts, substantially as and for the purposes described.

27. In combination with the fuselage of an aeroplane, an elongated hook support located one at each side of the fuselage and mounted to project upwardly and to the rear from the fuselage or lie alongside the sides thereof, and a chain connecting said supports adjacent their outer ends, said chain being flexible in one direction but held rigid against bending in the opposite direction beyond a predetermined point, substantially as and for the purposes described.

28. In combination with the fuselage of an aeroplane, an elongated hook support located at each side of the fuselage and mounted to extend upwardly and to the rear from the fuselage or lie alongside the sides thereof, a chain connecting said supports adjacent their outer ends, said chain comprising a plurality of pivotally connected links, coacting stops on the links limiting the flexibility of the chain in one direction, and springs associated with the links tending to bring said stops into engagement.

29. In combination with the fuselage of an aeroplane, an elongated hook support located at each side of the fuselage and mounted to extend upwardly and to the rear from the fuselage or lie alongside the sides thereof, a chain connecting said supports adjacent their outer ends, comprising a plurality of connected links adapted to lie against the upper side of the fuselage when the said supports are in lower position, and means on the links limiting the extent of bending of the chain in the opposite direction when the said supports are in upper position and providing a rigid stay between the supports to hold the same against approach toward each other beyond a predetermined point.

30. Means for landing aeroplanes, comprising a landing element with which an aeroplane may engage at the end of a flight, means for mounting said element for movement in a straight line parallel to the direction of flight of the plane, and automatically operable braking means for frictionally resisting the movement of said element.

31. Means for landing aeroplanes, comprising a landing element with which an aeroplane may engage at the end of a flight, means for mounting said element for movement in a straight line parallel to the direction of flight of the plane, a visible guide indicator carried on said element, and a second visible guide indicator located in advance of the first indicator, the line between the two indicators paralleling substantially the direction of movement of said landing element.

32. Means for landing aeroplanes, comprising a flexible track, means for supporting the same at its ends, a landing element having a flexible construction in a direction parallel to the track, so as to swing in said direction on connection of an aeroplane in flight therewith and also having a flexible landing member with which the aeroplane connects, means for mounting the said element on and below the track for movements paralleling the track, and means for tightening or slacking the track between its end supporting means.

33. Means for landing aeroplanes, comprising a flexible track, means for supporting the same at its ends, a landing element having a flexible construction for cushioning the landing of an aeroplane connecting therewith in flight, means for mounting said element to traverse the track below the same, and yieldable braking means automatically engaging the flexible trap for retarding the movement of the aeroplane along the same, substantially as described.

34. A construction of the class described, comprising spaced apart vertical supports located at a distance apart and having upward end portions curved inwardly and extending beyond the center line of the ship, a cable carried between the upper ends of the supports, a carriage mounted to traverse the cable including a roller to ride on the cable and a frame having portions extending in opposite directions from the roller, lines depending from the outer ends of the frame, and an aeroplane landing element carried by the lines, substantially as described.

35. In combination with a substantially horizontal track, a carriage mounted to traverse the track, an aeroplane landing element suspended from the carriage, said element including a horizontal rigid member, vertical frames pivotally connected to the ends of said rigid member and adapted to turn towards or away from each other, each of said frames, at its lower end, having a plurality of jointed sections connected therewith, the pivotal axes of which are at right angles to the pivotal axes of the frames, and a landing cable connecting the lowermost of said sections.

36. In a construction of the character described, a substantially horizontal track element, an aeroplane engaging landing element, means for suspending said aeroplane landing element below the track element and for mounting the same to traverse the length of the track element, a flight indicating element carried by the aeroplane landing element, and a second flight indicating element, near the end of the track element towards which the said aeroplane landing element moves after connection of an aeroplane therewith.

37. In combination with an aeroplane landing member mounted for movement in a straight line after engagement of an aeroplane in flight therewith, of two spaced apart guiding lights, one connected with the landing member, and the other positioned at a point a distance therefrom, and in such alinement as to indicate the proper line of flight movement of said landing member, substantially as described.

38. In combination with the fuselage of an aeroplane two supports, located one on each side of the fuselage, landing hook members connected one to the outer end of each support, a semi-revolving shaft suitably supported on the fuselage to which the supports are secured at the opposite end, spring means tending to rotate said shaft to elevate the supports and manually operable means for drawing the supports to a lower position along the side of the fuselage.

39. In combination with the fuselage of an aeroplane an elongated hook support, having a pivoted roller supporting surface therein, located one on each side of the fuselage and mounted to project upwardly and to the rear from the fuselage or lie alongside the sides thereof, and a chain connecting said supports, adjacent their outer ends, said chain being flexible in one direction but held rigid against bending in the opposite direction beyond a predetermined point, substantially as and for the purpose described.

40. In combination, a support, means movably mounted thereon to travel horizontally on said support, a pair of spaced apart lines carried by said means and depending therefrom, means for holding said lines apart at their lower ends, and a flexible trapeze perch supported by said lines and normally held in horizontal position by said means which holds the lines apart.

41. In combination, a substantially horizontal support, a pair of spaced apart lines connected to and depending from the support, members located substantially vertical and depending from the lower ends of said lines, a flexible connecting member connecting the lower ends of said members, and means for holding said lines spaced apart at their lower ends, said members being capable of moving inward toward each other at their lower ends.

42. In combination, a located support, means mounted thereon for movements in a substantially horizontal plane, a pair of spaced apart lines depending from said movable means, a substantially horizontal flexible member carried between and below the lower ends of said lines, and means normally holding said flexible member horizontally, substantially as described.

43. In an apparatus of the character described, an overhead carrier, a receiver suspended therefrom comprising a substantially horizontal rigid member, a flexible member located below the rigid member in substantial parallelism therewith, and means for connecting the flexible member with the rigid member so as to maintain said flexible member normally in horizontal position.

44. In an apparatus of the character described, an overhead carrier, a receiver suspended therefrom comprising an upper substantially horizontal rigid bar, members pivotally connected to and suspended, one from each end of the horizontal bar, and a flexible member connecting the lowers ends of said suspended members, substantially as described.

45. In an apparatus of the class described, a suspended receiver with which an aeroplane is adapted to connect, comprising a rigid substantially horizontal bar, a flexible substantially horizontal member located below the rigid bar, and means connecting the flexible member and said bar normally maintaining the flexible member in taut condition.

46. In an apparatus of the class described, an overhead carrier, a receiver suspended therefrom including a flexible member adapted to be engaged by and connected to a part of an aeroplane, and means for normally holding said flexible member in taut condition, said means yielding on engagement of an aeroplane therewith to permit proper suspension of the aeroplane and maintenance of the same in even horizontal position.

47. In an apparatus of the class described, an overhead carrier, spaced apart lines suspended therefrom, a vertical member suspended at the lower end of each line, a substantially horizontal rigid bar disposed between and pivotally connected with the upper ends of said vertical members, and a flexible member disposed between and connecting the lower ends of said vertical members.

48. In combination, a support, means mounted thereon for movement in a substantially horizontal plane, a pair of spaced apart lines depending from said movable means, an aeroplane receiving and connecting member carried at the lower ends of the lines and including a flexible member with which the aeroplane is designed to connect, and means for normally maintaining said flexible member substantially horizontal.

49. A construction of the class described, comprising a substantially horizontal track, a carriage mounted to traverse the track, a trapeze perch suspended from the carriage including a lower narrow elongated horizontal member with which the aeroplane is adapted to have connection in landing thereon, and means for raising or lowering the perch.

50. An aeroplane comprising a fuselage, hook members terminating in hooks attached one at each side of the fuselage, said hook members being mounted for movement about a horizontal axis on said fuselage, means for limiting the upward movement of the hook members with respect to the fuselage, means normally tending to elevate the hook members, and means releasably latching the same in lower position alongside the fuselage.

51. An aeroplane comprising a fuselage, hook members terminating in forwardly open hooks attached one at each side of the fuselage and mounted for movement about a horizontal axis on said fuselage, means normally tending to elevate the hook members, means for drawing said hook members to a lower position alongside the sides of the fuselage, and releasable means for holding the hook members in lower position.

52. An aeroplane comprising a fuselage, a shaft mounted on the fuselage, spring means tending to turn the shaft in one direction, hook members one on each end of the shaft and extending rearwardly therefrom and normally tending to extend upwardly and to the rear under the influence of said spring means, and means for holding the hook members in a lower position alongside the sides of the fuselage.

53. An aeroplane comprising a fuselage, a shaft mounted horizontally on the fuselage, spring means tending to turn the shaft in one direction, a hook member connected at each end of the shaft and normally extending upwardly and to the rear therefrom under the influence of the spring means, means for manually moving said hook members to lower position alongside the sides of the fuselage, latching means engageable with said hook members to hold the same in lower position, and means to manually release said latching means.

54. In combination, a support, spaced apart lines depending from said support, a substantially horizontal cross bar located at the lower ends of said lines, a frame pivotally mounted at each end of the bar, said frames having each a part extending above the point of pivotal connection of the frame to the bar, said lines passing under the points of pivotal connection of said frames to said bar and crossing to the opposite frame in an upward direction and attached to the upwardly extending portion thereof, substantially as described.

55. In combination in a trapeze perch, a cross bar, a shaft passing through each end of the bar, a frame pivotally mounted on said shaft at each end of the cross bar, each frame having a part extending above the bar, a pulley mounted on each shaft, two flexible members connected one to each of said frames above the bar and passing to and around the pulley at the other end of said bar and thence extending upwardly, and a flexible member connecting the frames below the bar.

56. In combination, a trapeze perch comprising a substantially horizontal cross bar, a pair of frames pivotally mounted one at each end of the cross bar, each including a part extending above the pivot having an arc shaped upper side curved downwardly and inwardly, lines connected one to the upper side of each arc shaped portion and thence extending to and around the pivot of the opposite frame and thence upwardly, said lines crossing each other, and a flexible member disposed between the lower ends of said frames, substantially as described.

57. In combination with an aeroplane, means pivotally connected with the fuselage of the plane and normally extending backwardly from the point of pivotal connection, said means being equipped at its free end with trapeze engaging means, means for engaging and holding said first mentioned means in a lower position, means normally tending to elevate said first mentioned means, and means controlled by and released by the pilot of the plane to free said first mentioned means for movement to upper position, substantially as described.

58. In combination with an aeroplane, a hook member pivotally connected thereto at its lower end and extending upwardly and to the rear, a hook pivotally connected at the free end of the hook member and adapted to turn to the rear, yielding means normally turning the hook forwardly, and releasable means for holding the hook in normal forward position.

59. In combination in an aeroplane, a hook member pivotally connected thereto at its lower end and adapted to extend upwardly and to the rear, a hook pivotally connected at the free end of the hook member and adapted to turn the rear, spring means normally turning the hook forwardly, a pivotally mounted catch, means on the hook with which the catch normally engages to hold the hook against rearward turning movement, and manually operative means for moving the catch to disengage it from the hook.

60. In combination with a fuselage of an aeroplane, an elongated hook support connected to said fuselage and mounted to extend upwardly and to the rear therefrom, a hook at the upper end of said support, means for mounting said hook support whereby it may be turned about a horizontal axis into stream line position with said fuselage or elevated to operative position substantially as described.

61. A construction containing the elements in combination defined in claim 60 combined with means for pivotally mounting said hook at the free end of said hook support, means for latching the hook in operative position and means for manually releasing said latch whereby the hook may turn about its pivotal mounting on said hook support.

62. In combination a moving vessel, aeroplane landing means carried by said vessel comprising, a suspended trapeze perch, means for raising and lowering said trapeze perch and means for mounting said trapeze perch whereby the same may move in the direction of movement of said vessel and upon connection of an aeroplane with said perch the direction of flight of which is the same as the movement of said vessel but faster than said vessel.

In testimony whereof I affix my signature.

WILLIS J. PERKINS.